(12) United States Patent
Matsuda (10) Patent No.: US 12,515,513 B2
(45) Date of Patent: Jan. 6, 2026

(54) POWER GENERATION ASSEMBLY AND SERIES HYBRID VEHICLE

(71) Applicant: KAWASAKI MOTORS, LTD., Akashi (JP)

(72) Inventor: Yoshimoto Matsuda, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 275 days.

(21) Appl. No.: 18/546,757

(22) PCT Filed: Mar. 16, 2021

(86) PCT No.: PCT/JP2021/010578
§ 371 (c)(1),
(2) Date: Aug. 16, 2023

(87) PCT Pub. No.: WO2022/195709
PCT Pub. Date: Sep. 22, 2022

(65) Prior Publication Data
US 2024/0131916 A1   Apr. 25, 2024
US 2024/0227534 A9   Jul. 11, 2024

(51) Int. Cl.
*B60K 6/46*   (2007.10)
*B60L 50/61*   (2019.01)

(52) U.S. Cl.
CPC ............... *B60K 6/46* (2013.01); *B60L 50/61* (2019.02); *B60Y 2200/92* (2013.01)

(58) Field of Classification Search
CPC ........ B60K 6/46; B60L 50/61; B60Y 2200/92
See application file for complete search history.

(56) References Cited

U.S. PATENT DOCUMENTS

| 9,038,754 B2 | 5/2015 | Takagi | |
| 2008/0024035 A1* | 1/2008 | Aydin | B60K 6/46 |
| | | | 310/156.32 |
| 2017/0256106 A1 | 9/2017 | Hino | |
| 2024/0140189 A1* | 5/2024 | Matsuda | B60K 6/46 |

FOREIGN PATENT DOCUMENTS

| CN | 104953764 A | * | 9/2015 |
| JP | 2002316541 A | | 10/2002 |
| JP | 2018012346 A | | 1/2018 |

* cited by examiner

*Primary Examiner* — Edwin A Young
(74) *Attorney, Agent, or Firm* — Alleman Hall & Tuttle LLP (57) ABSTRACT

A power generation assembly includes: an engine including a crank shaft having an axial direction extending vertically; and an axial gap power generator located at one side of the engine in the axial direction and including a rotor connected to the crank shaft so as to be rotatable about a rotation axis extending in the axial direction and a stator opposed to the rotor in the axial direction while being spaced apart from the rotor in the axial direction.

16 Claims, 8 Drawing Sheets

POWER GENERATION ASSEMBLY AND SERIES HYBRID VEHICLE

CROSS REFERENCE TO RELATED APPLICATIONS

This application is a national phase application of International Application No. PCT/JP2021/010578, filed on Mar. 16, 2021, entitled POWER GENERATION UNIT AND SERIES HYBRID VEHICLE, which is incorporated by reference herein in its entirety.

BACKGROUND OF THE INVENTION

Field of the Invention

The present disclosure relates to a power generation assembly and a series hybrid vehicle.

Description of the Related Art

U.S. Pat. No. 9,038,754 discloses a series hybrid vehicle including: a traveling electric motor driven by electric power supplied from a battery; and a power generation engine that drives a power generator to charge the battery. The engine and the power generator are integrated with each other to form a power generation assembly. The engine is located such that a crank shaft is directed in a vertical direction, and the power generator is located under the engine.

SUMMARY OF THE INVENTION

The size of the power generation assembly in the vertical direction is desired to be further reduced depending on uses. However, when the size of the power generator or the engine in the vertical direction is simply reduced, the power generation performance deteriorates.

An object of the present disclosure is to make an entire power generation assembly compact without deteriorating power generation performance.

A power generation assembly according to one aspect of the present disclosure includes: an engine including a crank shaft having an axial direction extending vertically; and an axial gap power generator located at one side of the engine in the axial direction and including a rotor connected to the crank shaft so as to be rotatable about a rotation axis extending in the axial direction and a stator opposed to the rotor in the axial direction while being spaced apart from the rotor in the axial direction.

According to the above configuration, the power generator is located at one vertical-direction side of the engine including the crank shaft extending in the vertical direction. Therefore, an occupied space of the power generation assembly in a horizontal direction is reduced. The power generator is of an axial gap type and is located such that the rotor rotates about the rotation axis extending in the vertical direction. Therefore, the occupied space of the power generation assembly in the vertical direction is also reduced. Thus, the entire power generation assembly can be made compact without deteriorating the power generation performance.

A series hybrid vehicle according to one aspect of the present disclosure includes: a power generation assembly; a battery that is charged by electric power generated by the power generation assembly; an electric motor that is driven by the electric power supplied from the battery and generates traveling power; at least one wheel; and a vehicle body supported by the wheel. The power generation assembly includes: an engine including a crank shaft extending in a vertical direction; and an axial gap power generator located at one side of the engine in the vertical direction and including a rotor connected to the crank shaft so as to be rotatable about a rotation axis extending in an axial direction of the crank shaft and a stator opposed to the rotor in the axial direction while being spaced apart from the rotor in the axial direction. The power generation assembly is mounted on the vehicle body such that a lower end of the axial gap power generator is located lower than an upper end of the wheel.

According to the above configuration, the hybrid vehicle having high space efficiency can be provided by the compact power generation assembly.

DETAILED DESCRIPTION

Hereinafter, an embodiment will be described with reference to the drawings. A power generation assembly 1 described below includes a crank shaft 22 extending in a vertical direction (upper-lower direction). In other words, the upper-lower direction of the power generation assembly 1 is a direction in which the crank shaft 22 extends, and a direction in a plane which is orthogonal to the crank shaft 22 is a horizontal direction of the power generation assembly 1.

Figure 1:
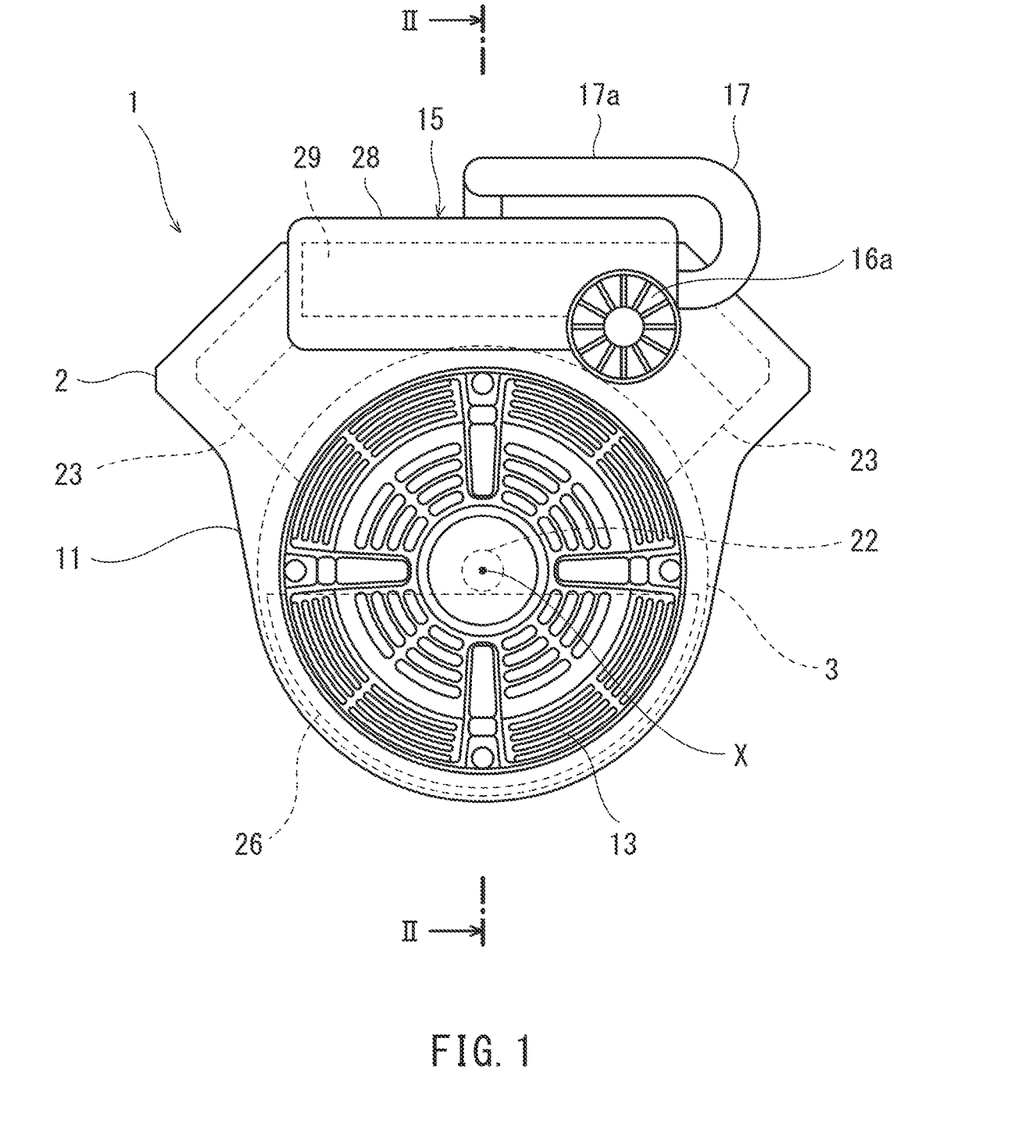
FIG. 1 is a plan view of a power generation assembly according to an embodiment.
Figure 2:
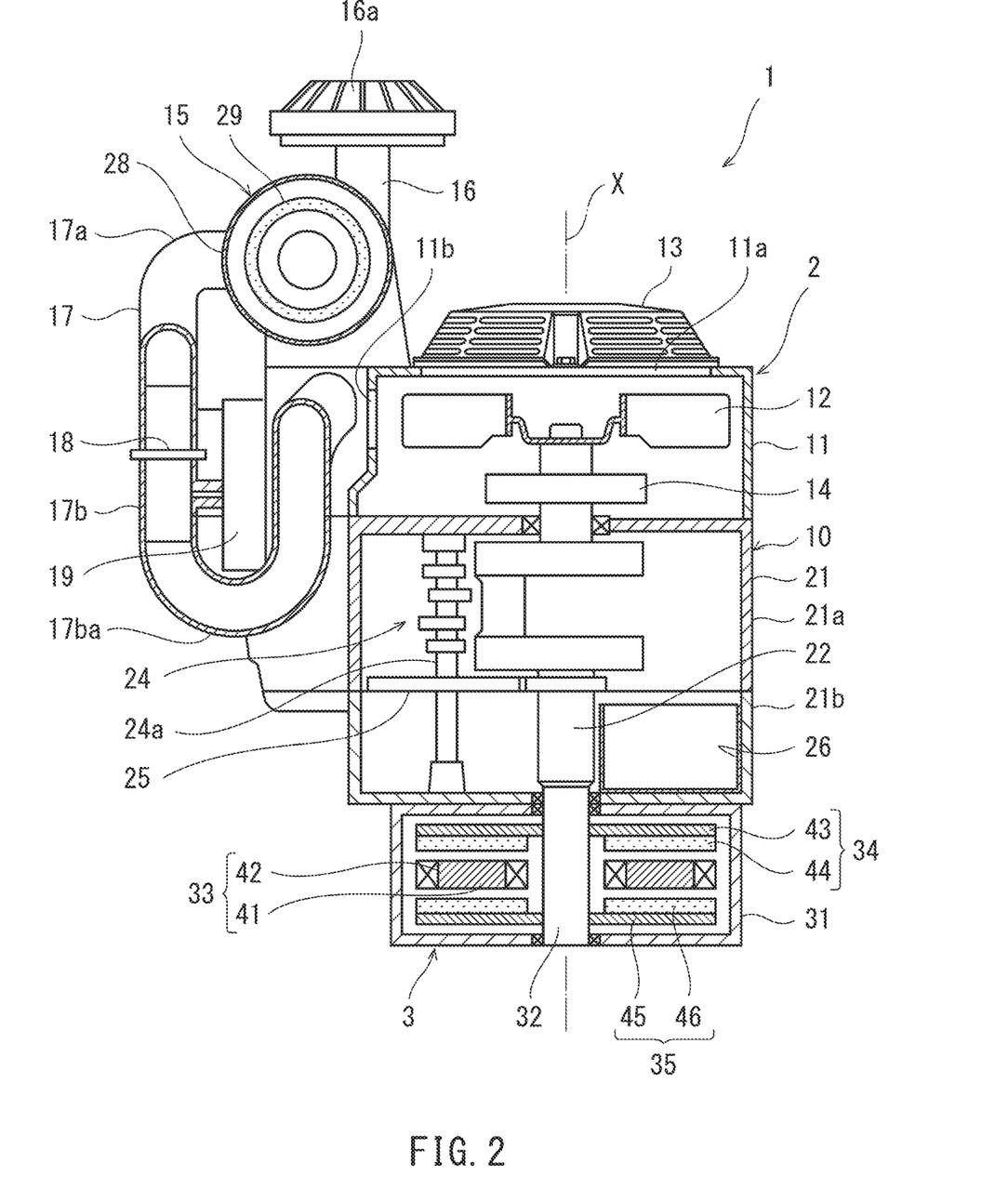
FIG. 2 is a sectional view taken along line II-II of FIG. 1 showing the power generation assembly.

FIG. 1 is a plan view of the power generation assembly 1 according to the embodiment. FIG. 2 is a sectional view taken along line II-II of FIG. 1 showing the power generation assembly 1. As shown in FIGS. 1 and 2, the power generation assembly 1 includes an engine unit 2 and an axial gap power generator 3 driven by the engine unit 2. The engine unit 2 includes: an engine 10 that is an internal combustion engine; and an upper cover 11 located at an upper side of the engine 10.

The engine 10 of the engine unit 2 is a multiple cylinder engine, and for example, is a V-twin engine. The engine 10 includes a crank case 21, the crank shaft 22, a pair of cylinders 23, and a valve gear 24. The crank shaft 22 is accommodated in the crank case 21 while being rotatably supported by the crank case 21. A rotation axis X of the crank shaft 22 extends in the vertical direction. The crank shaft 22 rotates in association with reciprocating movements of pistons in the cylinders 23. The crank shaft rotates a connection target to give kinetic energy to the connection target. Each of the cylinders 23 extends in the horizontal direction when viewed from the crank shaft 22.

The upper cover 11 of the engine unit 2 is fixed to the crank case 21 so as to cover the crank case 21 from above. The upper cover 11 has an inverted U-shaped section that is open downward. The upper cover 11 defines an internal space together with the crank case 21. An upper portion of the crank shaft 22 which projects upward from the crank case 21 is located in the internal space of the upper cover 11. A cooling fan 12 and a sub-power generator 14 are located above the engine 10 and in the internal space of the upper cover 11.

The sub-power generator 14 is attached to the upper portion of the crank shaft 22. To be specific, the sub-power generator 14 generates electric power in such a manner that a rotor (not shown) thereof rotates in association with the crank shaft 22. The electric power generated by the sub-power generator 14 is used as electric power necessary to drive the engine 10. For example, the electric power generated by the sub-power generator 14 is supplied to a below-described electronic control unit 4, and the like.

The cooling fan 12 is attached to the upper portion of the crank shaft 22 so as to be located above the sub-power generator 14. An inflow opening 11a is located at an upper plate portion of the upper cover 11. A fan cover 13 is detachably attached to the upper cover 11 so as to cover the inflow opening 11a. The fan cover 13 has, for example, a net structure that prevents foreign matters from passing therethrough but allows air to pass therethrough.

An outflow opening 11b is located at a side plate portion of the upper cover 11. A louver may be located at the outflow opening 11b. When the cooling fan 12 rotates in association with the crank shaft 22, air is sucked through the fan cover 13 and the inflow opening 11a. The sucked air cools the sub-power generator 14 and the engine 10 and is discharged through the outflow opening 11b to an outside.

The valve gear 24 includes a camshaft 24a extending in the vertical direction and opens and closes intake/exhaust valves (not shown) of the cylinders 23 in mechanical association with the crank shaft 22. The configuration of the valve gear 24 is publicly known and is not especially limited. The rotation of the crank shaft 22 is transmitted to the camshaft 24a through a gear 25. In the horizontal direction, the valve gear 24 is located at one side of the rotation axis X of the crank shaft 22 at which the cylinders 23 exist. To be specific, the valve gear 24 is located in one (the side at which the cylinders 23 exist) of two regions obtained by dividing a space by a virtual vertical plane which includes the rotation axis X of the crank shaft 22 and is perpendicular to a virtual line connecting the rotation axis X and the center of gravity of the pair of cylinders 23.

The engine unit 2 includes an air cleaner 15 that purifies intake air to be supplied to the engine 10. An upper end of the air cleaner 15 is located higher than an upper end of the engine 10. Specifically, the upper end of the air cleaner 15 is located higher than an upper surface of the upper cover 11. The air cleaner 15 includes an air cleaner case 28 and a cleaner element 29 (filter) accommodated in the air cleaner case 28.

Specifically, the air cleaner case 28 includes a tubular peripheral wall portion and end wall portions which close both ends of the peripheral wall portion. The air cleaner case 28 is located such that an axis thereof is directed in the horizontal direction. The cleaner element 29 has a cylindrical shape. A radially inner side of the cleaner element 29 is a clean side, and a radially outer side of the cleaner element 29 is a dirty side.

A duct 16 projects upward from the peripheral wall portion of the air cleaner case 28. The duct 16 communicates with the dirty side of the air cleaner 15. A suction opening 16a is located at an upper end of the duct 16. To be specific, the suction opening 16a is located higher than the air cleaner case 28 and the cleaner element 29. A filter may be located at the suction opening 16a. Outside air sucked through the suction opening 16a is guided to the dirty side located at a radially outer side of the cleaner element 29, flows through the cleaner element 29 to be purified, and is guided to the clean side located at a radially inner side of the cleaner element 29.

An intake air pipe 17 that communicates with the clean side located at the radially inner side of the cleaner element 29 is connected to the end wall portion of the air cleaner case 28. The intake air pipe 17 includes a first portion 17a and a second portion 17b. The first portion 17a extends in the horizontal direction. The second portion 17b has a U shape that extends downward, makes a U-turn, and extends upward. Therefore, the length of an intake air passage of the intake air pipe 17 is made long in a small space. A downstream end of the second portion 17b of the intake air pipe 17 is located such that the intake air can be supplied to combustion chambers of the cylinders 23. The second portion 17b may have an inverted U shape that extends upward, makes a U-turn, and extends downward.

A throttle device 18 including a throttle valve is located at the intake air pipe 17. A fuel supplier 19 is located at the intake air pipe 17. The fuel supplier 19 is, for example, an injector or a carburetor. Specifically, the throttle device 18 and the fuel supplier 19 are located at the second portion 17b of the intake air pipe 17 and upstream of a U-turn portion 17ba. Therefore, the intake air passage extending from the throttle device 18 and the fuel supplier 19 to the cylinders 23 is made long.

An oil pan 26 that is open upward is located at a lower portion of the crank case 21. Specifically, the oil pan 26 is located at a lower portion of the internal space of the crank case 21. The oil pan 26 is located at such a height as to overlap the crank shaft 22 in a direction (vertical direction) along the rotation axis X of the crank shaft 22. In the horizontal direction, the oil pan 26 is located at a side of the rotation axis X of the crank shaft 22 which is opposite to the side at which the valve gear 24 exists.

To be specific, the oil pan 26 is located in the other (the side at which the cylinders 23 do not exist) of the two regions obtained by dividing the space by the virtual vertical plane which includes the rotation axis X of the crank shaft 22 and is perpendicular to the virtual line connecting the rotation axis X and the center of gravity of the pair of cylinders 23. The oil pan 26 may be expanded so as to reach a vertically lower side of the valve gear 24. Moreover, a lower case 21b may also serve as the oil pan.

The axial gap power generator 3 is located at a lower side of the engine 10. The axial gap power generator 3 may be located at an upper side of the engine 10. The axial gap power generator 3 is located under the oil pan 26. The axial gap power generator 3 is attached to a lower surface of the engine 10. The axial gap power generator 3 is located lower than the entire engine unit 2.

As described below, the axial gap power generator 3 includes a substantially plate-shaped stator 33 and substantially plate-shaped rotors 34 and 35. The stator 33 and the rotors 34 and 35 are lined up in an axial direction of a rotating shaft 32 such that main surfaces of the stator 33 and the rotors 34 and 35 are opposed to each other. To be specific, in the axial gap power generator 3, a main direction of magnetic flux of the rotors 34 and 35 is the axial direction of the rotating shaft 32. Therefore, the dimension of the axial gap power generator 3 in the axial direction of the rotating shaft 32 can be reduced.

The axial gap power generator 3, the cooling fan 12, and the sub-power generator 14 are located coaxially with the crank shaft 22. The axial gap power generator 3 is larger than the sub-power generator 14. Specifically, the volume of the axial gap power generator 3 is larger than the volume of the sub-power generator 14. In a top view of the power generation assembly 1, an area occupied by the axial gap power generator 3 is larger than an area occupied by the sub-power generator 14. A rated output (power generation capability per unit time) of the axial gap power generator 3 is larger than a rated output (power generation capability per unit time) of the sub-power generator 14.

The dimension of the axial gap power generator 3 in the vertical direction is larger than the dimension of the sub-power generator 14 in the vertical direction. The dimension of the axial gap power generator 3 in the vertical direction is smaller than the dimension of the axial gap power generator 3 in the horizontal direction. The dimension of the axial gap power generator 3 in the vertical direction is smaller than the dimension of the engine 10 in the vertical direction. When viewed from a direction in which the rotation axis X extends, the axial gap power generator 3 is located inside an outer shape of the engine 10 (see FIG. 1). When viewed from the direction in which the rotation axis X extends, the axial gap power generator 3 may protrude outward from the outer shape of the engine 10.

The axial gap power generator 3 includes a power generator case 31, the rotating shaft 32, the stator 33, the first rotor 34, and the second rotor 35. The rotating shaft 32 extending in the vertical direction is supported by the power generator case 31 so as to be rotatable. In a plan view, the power generator case 31 has a circular outer shape. The rotating shaft 32 is located at a lower side of the crank shaft 22. A rotation axis of the rotating shaft 32 coincides with the rotation axis X of the crank shaft 22. The rotating shaft 32 is coupled to the crank shaft 22 so as to rotate integrally with the crank shaft 22.

The first rotor 34, the stator 33, and the second rotor 35 are line up in this order from an upper side to a lower side. The stator 33 includes a stator core 41 and a coil 42 located at the stator core 41. The coil 42 is connected to a terminal of the axial gap power generator 3. The stator 33 is rotatable relative to the rotating shaft 32 and is supported in a stationary state relative to the power generator case 31.

The first rotor 34 includes a first rotor core 43 and a first magnet 44. The first rotor core 43 has a circular plate shape and is externally fitted to the rotating shaft 32 so as to rotate integrally with the rotating shaft 32. The first magnet 44 is located at the first rotor core 43 so as to be opposed to an upper surface of the stator 33. The second rotor 35 includes a second rotor core 45 and a second magnet 46. The second rotor core 45 has a circular plate shape and is externally fitted to the rotating shaft 32 so as to rotate integrally with the rotating shaft 32. The second magnet 46 is located at the second rotor core 45 so as to be opposed to a lower surface of the stator 33.

There is a gap between the first rotor 34 and the stator 33 in a direction along the rotation axis. Moreover, there is a gap between the second rotor 35 and the stator 33 in the direction along the rotation axis. The first rotor 34 and the second rotor 35 are connected to the crank shaft 22 through the rotating shaft 32 so as to rotate about the rotation axis X in association with the crank shaft 22. The configuration of the axial gap power generator 3 is not especially limited. For example, one rotor and a pair of stators may be included, or rotors and stators may be included. Or, one rotor and one stator may be included.

In the axial gap power generator 3, the first rotor 34 and the second rotor 35 are rotated by the crank shaft 22, and this generates a current at the coil 42 (power generation function). In the axial gap power generator 3, the first rotor 34 and the second rotor 35 are rotated by a magnetic field generated by supplying a current to the coil 42, and this generates rotational power that rotates the crank shaft 22 (motor function). The axial gap power generator 3 is an integrated starter generator (ISG) that has both of a power generation function of generating electric power by the rotational power of the crank shaft 22 of the engine 10 and a starter motor function of starting the engine 10.

Figure 3:
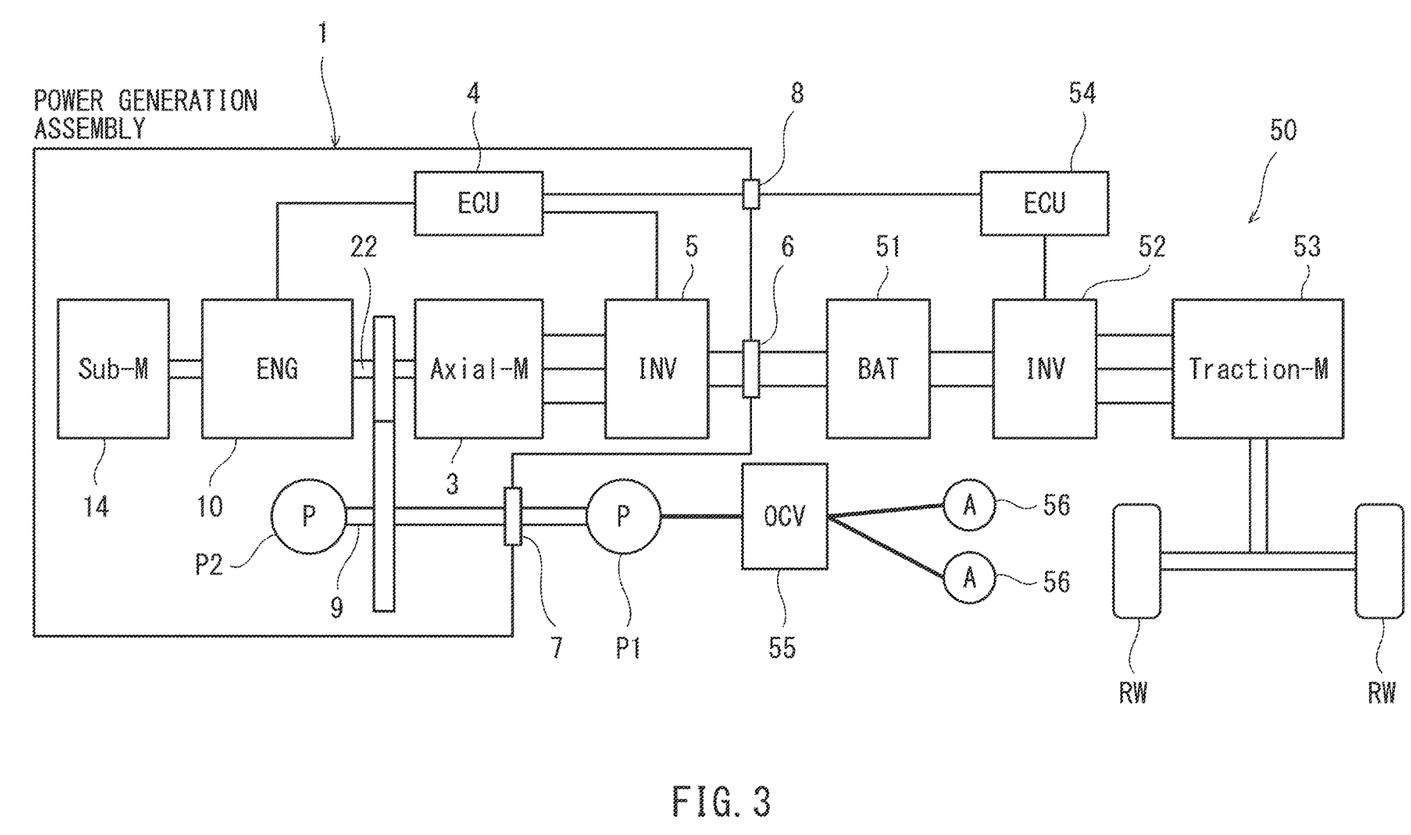
FIG. 3 is a block diagram of a hybrid vehicle on which the power generation assembly of FIG. 2 is detachably mounted.

FIG. 3 is a block diagram of a hybrid vehicle 50 on which the power generation assembly 1 of FIG. 2 is detachably mounted. As shown in FIG. 3, the power generation assembly 1 includes an inverter 5 (regulator) electrically connected to the axial gap power generator 3. The inverter 5 is integrally connected to the axial gap power generator 3. The inverter 5 convers AC power, generated by the axial gap power generator 3, into DC power, adjusts the voltage of the DC power, and charges a battery 51. In addition, the inverter 5 converts the DC power, discharged from the below-described battery 51, into the AC power, adjusts the voltage of the AC power, and supplies the AC power to the axial gap power generator 3.

The power generation assembly 1 includes the electronic control unit 4. The electronic control unit 4 controls the engine 10 and the inverter 5. The electronic control unit 4 controls the engine 10 such that the output of the engine 10 is constant. The power generation assembly 1 also includes a regulator (not shown) that converts the AC power, generated by the sub-power generator 14, into the DC power and adjusts the voltage of the DC power. In the power generation assembly 1, the engine 10, the axial gap power generator 3, the electronic control unit 4, the inverter 5, the sub-power generator 14, a cooling medium pump P2, and the like are fixed to each other and integrated with each other.

The hybrid vehicle 50 includes the battery 51, an inverter 52, a traction motor 53, an electronic control unit 54, and the like. The vehicle 50 is a series hybrid vehicle. The traction motor 53 generates traveling power and drives driving wheels (for example, rear wheels RW). The inverter 52 converts the DC power, discharged from the battery 51, into the AC power, adjusts the voltage of the AC power, and supplies the AC power to the traction motor 53. In addition, the inverter 52 converts the AC power, regenerated by the traction motor 53, into the DC power, adjusts the voltage of the DC power, and charges the battery 51. The electronic control unit 54 controls the inverter 52. The electronic control unit 54 can control traveling torque of the hybrid vehicle 50.

The power generation assembly 1 includes an electric interface 6. The electric interface 6 electrically connects the inverter 5 of the power generation assembly 1 to the battery 51 located outside the power generation assembly 1. In the case of contact power supply, the electric interface 6 is a detachable terminal or a detachable electric power connector. In the case of non-contact power supply, the electric interface 6 is a coil.

The power generation assembly 1 includes a communication interface 8. The communication interface 8 communicably connects the electronic control unit 4 of the power generation assembly 1 to the electronic control unit 54 located outside the power generation assembly 1. In the case of wired communication, the communication interface 8 is a detachable terminal or a detachable communication connector. In the case of wireless communication, the communication interface 8 is a known wireless communicator.

The hybrid vehicle 50 includes an oil pump P1, an oil control valve unit 55, and a hydraulic actuator 56. The oil pump P1 discharges oil when rotational driving power is input to a driven shaft of the oil pump P1. The hydraulic actuator 56 is, for example, a hydraulic cylinder that generates braking power. The oil control valve unit 55 opens and closes a passage between the oil pump P1 and the hydraulic actuator 56 to control hydraulic pressure to be applied to the hydraulic actuator 56. The operation of the oil control valve unit 55 is controlled by the electronic control unit 54.

The power generation assembly 1 includes a mechanical interface 7. The mechanical interface 7 can output the rotational power of the crank shaft 22 as mechanical energy. The mechanical interface 7 is, for example, a PTO shaft including an engaging portion (such as a spline groove or a keyway) that can be engaged with a mating member so as not to be rotatable relative to the mating member. A power transmitting path 9 (such as a gear mechanism, a chain-sprocket mechanism, or a belt-pulley mechanism) that transmits the rotational power of the crank shaft 22 to the mechanical interface 7 is located between the crank shaft 22 and the mechanical interface 7. The axial gap power generator 3 is mechanically connected to the power transmitting path 9.

The rotational power generated by the axial gap power generator 3 can be output from the mechanical interface 7 through the power transmitting path 9. The mechanical interface 7 is detachably connected to the driven shaft of the oil pump P1. To be specific, the oil pump P1 is driven by the rotational power supplied from the mechanical interface 7. Moreover, a driven shaft of the cooling medium pump P2 is mechanically connected to the power transmitting path 9.

The rotational power generated by the engine 10 and the rotational power generated by the axial gap power generator 3 can be superimposed on each other at the power transmitting path 9. When a predetermined condition is satisfied (for example, when there is a request from the electronic control unit 54), the electronic control unit 4 drives the engine 10 and also drives the axial gap power generator 3 as a motor. Therefore, the rotational power generated by both of the engine 10 and the axial gap power generator 3 is output from the mechanical interface 7 through the power transmitting path 9. At this time, while controlling the engine 10 such that the output of the engine 10 is constant, the electronic control unit 4 controls the inverter 5 so as to change the driving torque of the axial gap power generator 3. Thus, the electronic control unit 4 can adjust the output from the mechanical interface 7.

The electric interface 6, the mechanical interface 7, and the communication interface 8 are detachable from the hybrid vehicle 50. Therefore, the power generation assembly 1 is easily attachable to and detachable from the hybrid vehicle 50.

Figure 4:
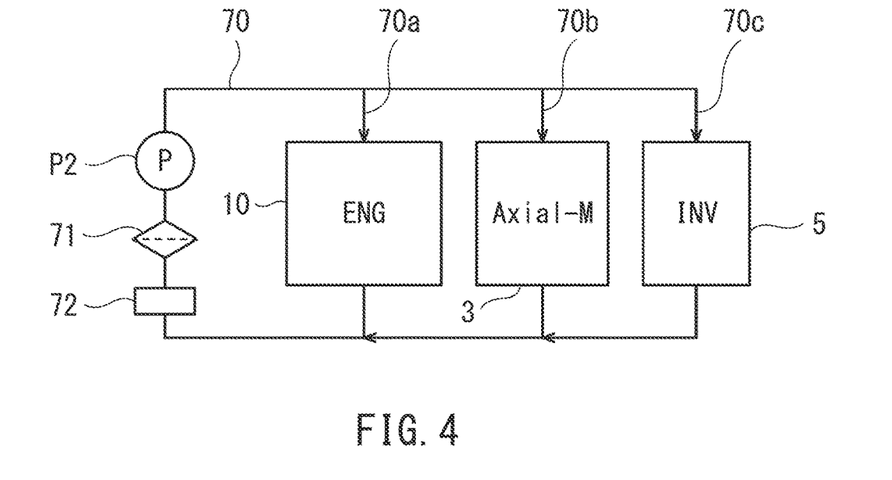
FIG. 4 is a block diagram of a cooling structure of the power generation assembly of FIG. 2.

FIG. 4 is a block diagram of a modified example of a cooling structure of the power generation assembly 1 of FIG. 2. As shown in FIG. 4, the power generation assembly 1 includes a cooling passage 70. The cooling passage 70 includes an engine cooling passage 70a that cools the engine 10. The engine cooling passage 70a is a circulation passage through which a cooling medium (for example, water) discharged from the cooling medium pump P2 is guided to the engine 10, and the cooling medium having cooled the engine 10 is returned to the cooling medium pump P2. A filter 71 and a radiator 72 are located at the engine cooling passage 70a.

The cooling passage 70 includes a power generator cooling passage 70b that cools the axial gap power generator 3. The power generator cooling passage 70b branches from the engine cooling passage 70a, guides the cooling medium (for example, water) to the axial gap power generator 3, and returns the cooling medium, having cooled the axial gap power generator 3, to the engine cooling passage 70a. The cooling passage 70 includes an inverter cooling passage 70c that cools the inverter 5. The inverter cooling passage 70c branches from the engine cooling passage 70a or the power generator cooling passage 70b, guides the cooling medium (for example, water) to the inverter 5, and returns the cooling medium, having cooled the inverter 5, to the engine cooling passage 70a or the power generator cooling passage 70b. The cooling passage 70 may not include the inverter cooling passage 70c and may not include the engine cooling passage 70a.

Figure 5:
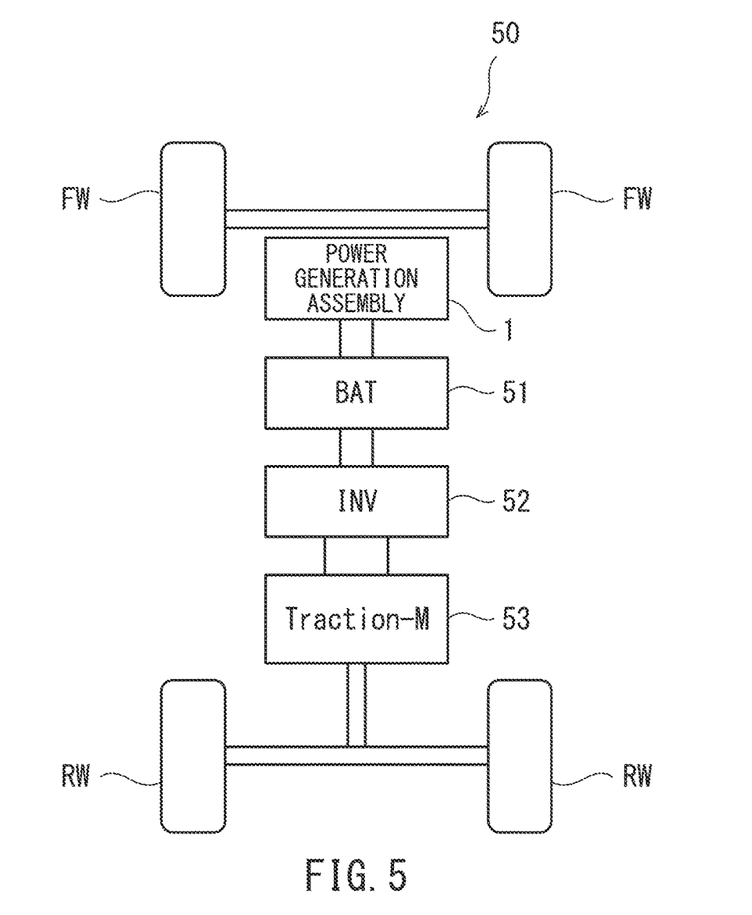
FIG. 5 is a schematic diagram of the hybrid vehicle of FIG. 3.
Figure 6:
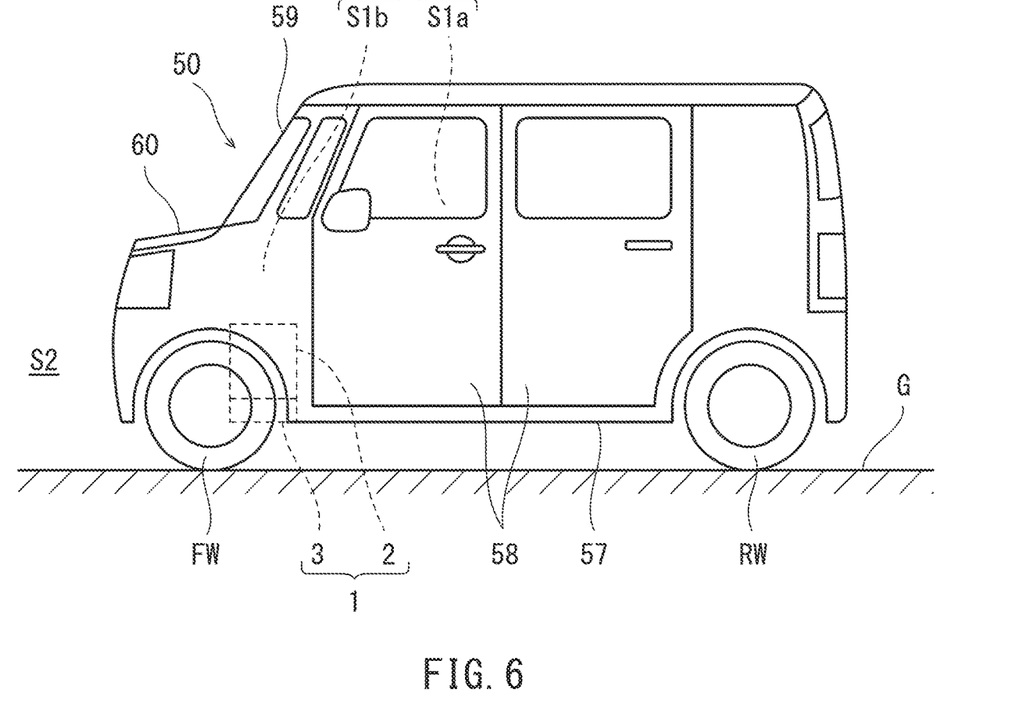
FIG. 6 is a side view of the hybrid vehicle of FIG. 5.

FIG. 5 is a schematic diagram of the hybrid vehicle 50 of FIG. 3. FIG. 6 is a side view of the hybrid vehicle 50 of FIG. 5. As shown in FIGS. 5 and 6, the hybrid vehicle 50 includes a pair of left and right front wheels FW and a pair of left and right rear wheels RW. The hybrid vehicle 50 is not limited to a four-wheeled vehicle and may be, for example, a two-wheeled vehicle or a three-wheeled vehicle. The hybrid vehicle 50 includes a vehicle body 57 supported by the front wheels FW and the rear wheels RW. The vehicle body 57 defines a vehicle internal space 51 that is separated from a vehicle external space S2.

The vehicle internal space 51 includes an occupant space S1a in which a user gets. The occupant space S1a is opened and closed by a door 58 attached to the vehicle body 57. The vehicle internal space 51 includes a front accommodating space S1b that is separated from the occupant space S1a. The front accommodating space S1b is located in front of the occupant space S1a. The front accommodating space S1b is opened and closed by a hood 60 (bonnet) which is located in front of a windshield 59 and attached to the vehicle body 57. The front accommodating space S1b includes a region located between the left front wheel FW and the right front wheel FW.

At least part of the power generation assembly 1 is located in the front accommodating space S1b. The power generation assembly 1 is supported by the vehicle body 57 in such a posture that the axial gap power generator 3 is located under the engine unit 2. The power generation assembly 1 is located in a space sandwiched between the left front wheel FW and the right front wheel FW. In a side view, at least part of the power generation assembly 1 overlaps the front wheel FW. The power generation assembly 1 is mounted on the vehicle body 57 such that a lower end of the axial gap power generator 3 is located lower than upper ends of the front wheels FW (when the hybrid vehicle 50 is in a stop state and an empty state). At least part of the power generation assembly 1 may be located in a rear accommodating space located behind the occupant space S1a instead of the front accommodating space S1b.

Figure 7:
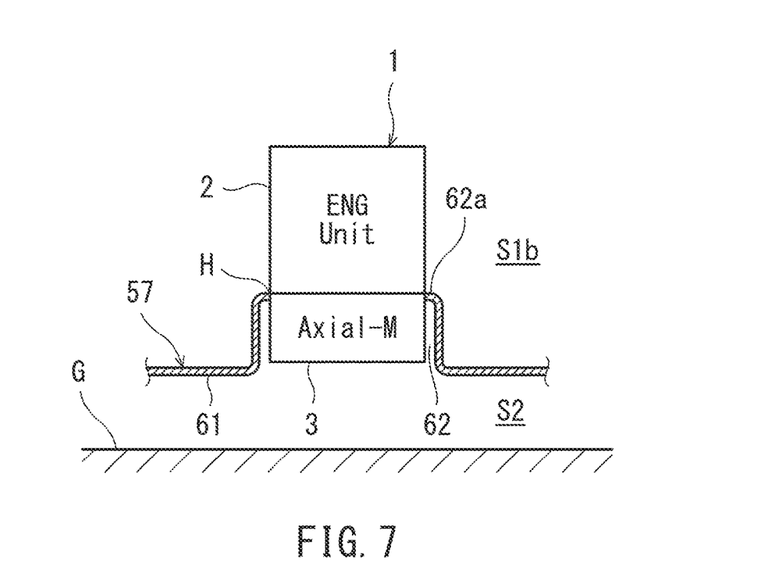
FIG. 7 is a schematic sectional view showing the power generation assembly of the hybrid vehicle of FIG. 6 and its vicinity which are viewed from front.

FIG. 7 is a schematic sectional view showing the power generation assembly 1 of the hybrid vehicle 50 of FIG. 6 and its vicinity which are viewed from front. As shown in FIG. 7, the axial gap power generator 3 is located at a lower side of a bottom plate 61 of the vehicle body 57. At least part of the axial gap power generator 3 is exposed to the vehicle external space S2 located outside the bottom plate 61. The axial gap power generator 3 may be located in both of the vehicle internal space S1 (in the present embodiment, the front accommodating space S1b) and the vehicle external space S2, or the entire axial gap power generator 3 may be located in the vehicle external space S2.

The bottom plate 61 includes a recess 62 that is recessed upward. An upper plate portion 62a of the recess 62 includes an opening H. The power generation assembly 1 extends through the opening H. The engine unit 2 is accommodated in the front accommodating space S1b. The axial gap power generator 3 is accommodated in the recess 62. The lower end of the axial gap power generator 3 is located at a height equal to or higher than the height of a lower surface of a portion of the bottom plate 61 which is adjacent to the recess 62.

The bottom plate 61 may not include the recess 62 that accommodates the axial gap power generator 3. To be specific, the axial gap power generator 3 may be located so as to project downward from the bottom plate 61. The entire power generation assembly 1 may be located in the vehicle internal space S1 (front accommodating space S1b). Air (traveling wind) in the vehicle external space S2 during traveling may be guided to the axial gap power generator 3. Moreover, the air (traveling wind) in the vehicle external space S2 during traveling may also be guided to the engine unit 2.

According to the above configuration, the axial gap power generator 3 is located at one vertical-direction side of the engine 10 including the crank shaft 22 extending in the vertical direction. Therefore, an occupied space of the power generation assembly 1 in the horizontal direction is reduced. The power generator 3 is of an axial gap type and is located such that the rotors 34 and 35 rotate about the rotation axis X extending in the vertical direction. Therefore, the occupied space of the power generation assembly 1 in the vertical direction is also reduced. Thus, the entire power generation assembly 1 can be made compact without deteriorating the power generation performance.

Moreover, the axial gap power generator 3 is located at a lower side of the engine 10. Therefore, the amount of heat transferred from the engine 10 to the axial gap power generator 3 can be made smaller than when the axial gap power generator 3 is located at an upper side of the engine 10.

Moreover, since the cooling fan 12 is located at an opposite side of the axial gap power generator 3 across the engine 10, the cooling fan 12 and the axial gap power generator 3 which operate in association with the crank shaft 22 are prevented from interfering with each other, and the cooling fan 12 can be easily located.

Moreover, the cooling fan 12 requires maintenance in which when foreign matters are sucked, the fan cover 13 is detached, and the foreign matters are removed. The air cleaner 15 requires maintenance in which the air cleaner case 28 is disassembled, and the cleaner element 29 is replaced. Herein, the upper end of the air cleaner 15 is located higher than the upper end of the engine 10. Therefore, the cooling fan 12 and the air cleaner 15 which are assumed to have high maintenance frequency are located at the same side (upper side) of the engine 10 in the vertical direction. Thus, the devices having high maintenance frequency are collectively positioned, and this can improve the convenience of the maintenance.

Moreover, the oil pan 26 is located above the axial gap power generator 3 located at the lower side of the engine 10 and is located at the lower portion of the crank case 21 of the engine 10. Therefore, a passage through which the oil from the engine 10 is guided to the oil pan 26 does not have to bypass the axial gap power generator 3, and therefore, the power generation assembly 1 can be kept compact.

Moreover, in the horizontal direction, the valve gear 24 is located at one side of the rotation axis X, and the oil pan 26 is located at the other side of the rotation axis X. To be specific, the valve gear 24 and the oil pan 26 are located so as to sandwich the rotation axis X. Therefore, the valve gear 24 and the oil pan 26 can coexist while keeping the power generation assembly 1 compact.

Moreover, the small sub-power generator 14 is located at an upper side of the engine 10, and the large axial gap power generator 3 is located at a lower side of the engine 10. Therefore, the center of gravity of the power generation assembly 1 is lowered, and this can improve arrangement stability. Furthermore, the sub-power generator 14 that is smaller than the axial gap power generator 3 is located at the upper side of the engine 10. Therefore, the sub-power generator 14 can be easily accommodated in the upper cover 11 while avoiding the cooling fan 12 located at the upper side of the engine 10 and being located close to the engine 10. Thus, the power generation assembly 1 can be made compact.

Moreover, when viewed from the axial direction X, the axial gap power generator 3 is located inside the outer shape of the engine 10. Therefore, the size of the power generation assembly 1 in the horizontal direction can be prevented from increasing.

Moreover, the power generation capability can be improved by using the multiple cylinder engine as the engine 10, and the power generation assembly 1 can be reduced in size in the vertical direction by the axial gap power generator 3 which can reduce the occupied space in the vertical direction. Especially, since the engine 10 includes the cylinders 23 located on the same horizontal plane and extending in different directions, the power generation assembly 1 can be suitably reduced in size in the vertical direction.

Moreover, the inverter 5 serves as part of the power generation assembly 1 and is integrally connected to the axial gap power generator 3. Therefore, the power generation assembly 1 capable of easily supplying stable DC power to an outside can be provided.

Moreover, the axial gap power generator 3 is the integrated starter generator having both of the power generation function and the starter motor function. Therefore, a starter motor does not have to be included, and this can reduce the size of the power generation assembly 1.

Moreover, the axial gap power generator 3 is cooled by the cooling medium flowing through the cooling passage 70, and this can improve the power generation performance. In addition, the cooling medium that cools the engine 10 and the cooling medium that cools the axial gap power generator 3 are the same as each other, and therefore, the power generation assembly 1 can be reduced in size.

Moreover, according to the power generation assembly 1, the mechanical energy output from the mechanical interface 7 by the rotational power of the engine 10 can be increased by an assist realized by the driving power of the axial gap power generator 3 serving as a motor. Since torque adjustment of the motor is easier than that of the engine, the torque of the rotational power output from the mechanical interface 7 can be easily and quickly adjusted.

Moreover, in the hybrid vehicle 50, the lower end of the axial gap power generator 3 is located lower than the upper ends of the front wheels FW. Therefore, the hybrid vehicle 50 having high space efficiency and low center of gravity can be provided by the compact power generation assembly 1.

Moreover, the axial gap power generator 3 is located at a lower side of the vehicle body 57 such that at least part thereof is exposed to the vehicle external space S2. Therefore, the axial gap power generator 3 is easily exposed to traveling wind, and this can efficiently cool the axial gap power generator 3.

Moreover, since the axial gap power generator 3 is located between the left front wheel FW and the right front wheel FW, an arrangement space for the other on-vehicle parts in the entire vehicle can be secured.

Figure 8:
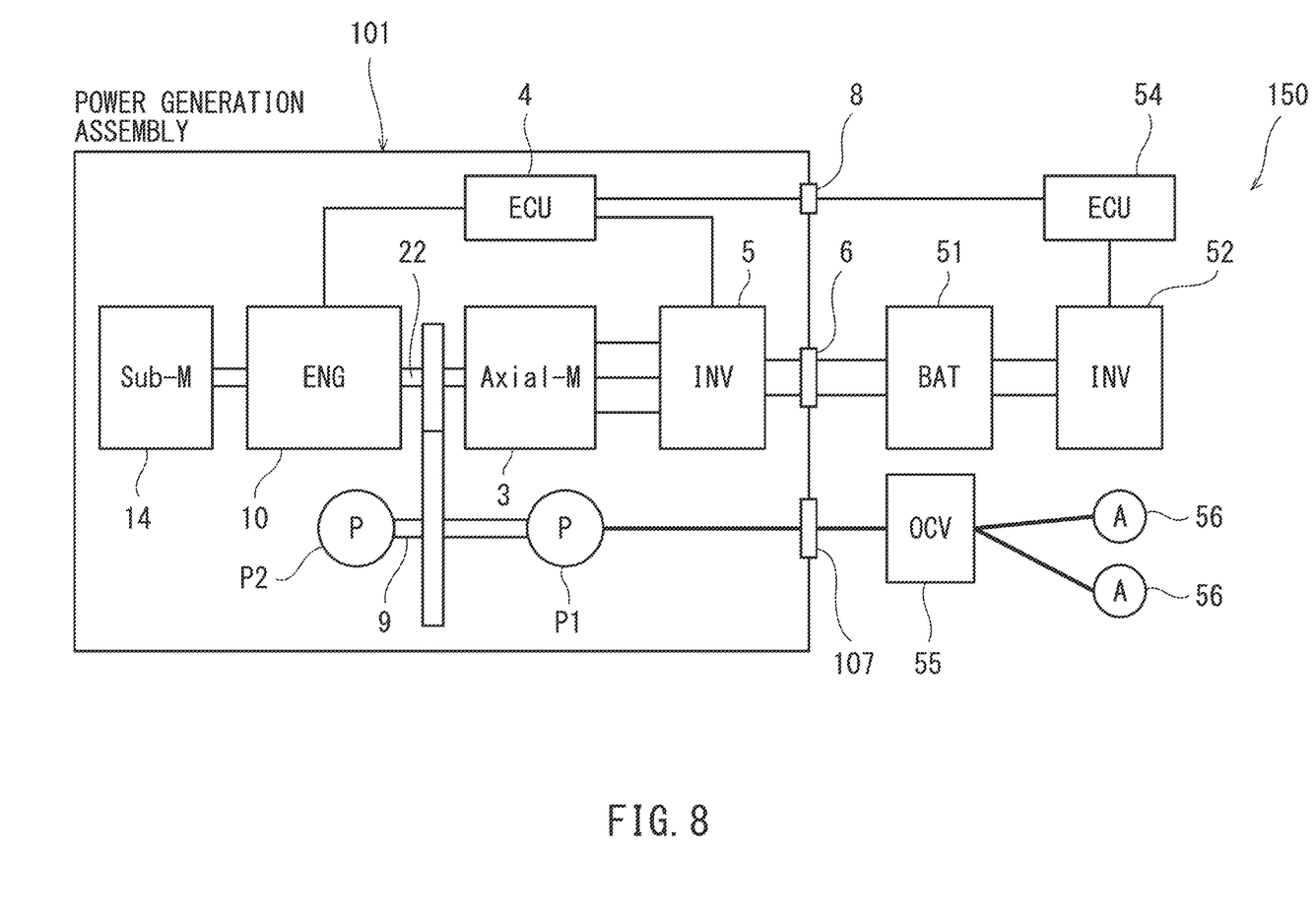
FIG. 8 is a block diagram of First Modified Example of the power generation assembly of FIG. 3.

FIG. 8 is a block diagram of a power generation assembly 101 of First Modified Example. As shown in FIG. 8, the oil pump P1 is included in the power generation assembly 101 of First Modified Example. The power generation assembly 101 includes a fluid interface 107 instead of the mechanical interface 7. The fluid interface 107 outputs the oil, discharged from the oil pump P1, to an outside.

Specifically, a pipe connected to an inflow port of the oil control valve unit 55 of a vehicle 150 is detachably connected to the fluid interface 107. The oil discharged from the oil pump P1 is output through the fluid interface 107 to the oil control valve unit 55 located outside the power generation assembly 101.

According to this configuration, since the oil pump P1 is included in the power generation assembly 101, the configuration of the vehicle 150 except for the power generation assembly 101 can be simplified. Moreover, since the power generation assembly 101 outputs fluid energy in addition to electric energy that is high in versatility, high output energy is easily supplied to external devices, and the external devices can easily perform high-load work. Moreover, when the fluid interface 107 of the power generation assembly 101 is connected to the external hydraulic actuator 56 that requires hydraulic pressure, the hydraulic pressure can be supplied to the hydraulic actuator 56. Therefore, the power generation assembly 101 that can easily supply the fluid energy and is of a cassette type can be provided. Since the other components are the same as those of the above embodiment, the same reference signs are used, and explanations thereof are omitted.

Figure 9:
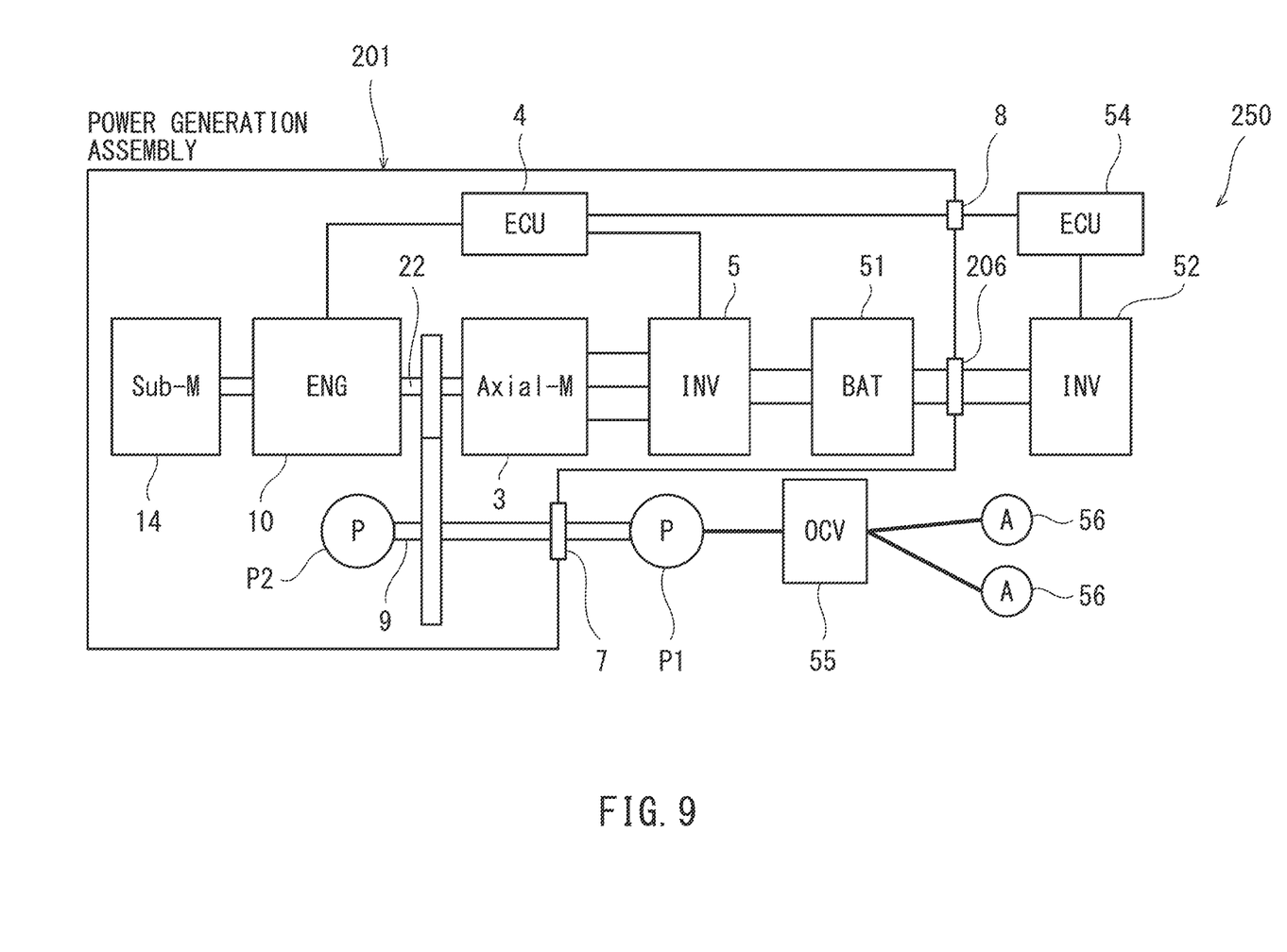
FIG. 9 is a block diagram of Second Modified Example of the power generation assembly of FIG. 3.

FIG. 9 is a block diagram of a power generation assembly 201 of Second Modified Example. As shown in FIG. 9, the battery 51 is included in the power generation assembly 201 of Second Modified Example. An electric interface 206 of the power generation assembly 201 outputs the DC power, discharged from the battery 51, to an outside. Specifically, an electric wire connected to the inverter 52 of a vehicle 250 is detachably connected to the electric interface 206 through a terminal or a connector. Non-contact power supply may be performed between the electric interface 206 and the inverter 52. In this case, the electric interface 206 may be a coil.

The electric power discharged from the battery 51 is supplied through the electric interface 206 to the inverter 52 located outside the power generation assembly 201. Moreover, the inverter 52 charges the battery 51 through the electric interface 206 by the electric power regenerated by the traction motor 53 (FIG. 3). The electronic control unit 4 controls charging and discharging of the battery 51 in accordance with a signal received from the electronic control unit 54 through the communication interface 8. According to this configuration, since the battery 51 is included in the power generation assembly 201, the configuration of the vehicle 250 except for the power generation assembly 201 can be simplified. Since the other components are the same as those in the above embodiment or the above modified example, the same reference signs are used, and explanations thereof are omitted.

Figure 10:
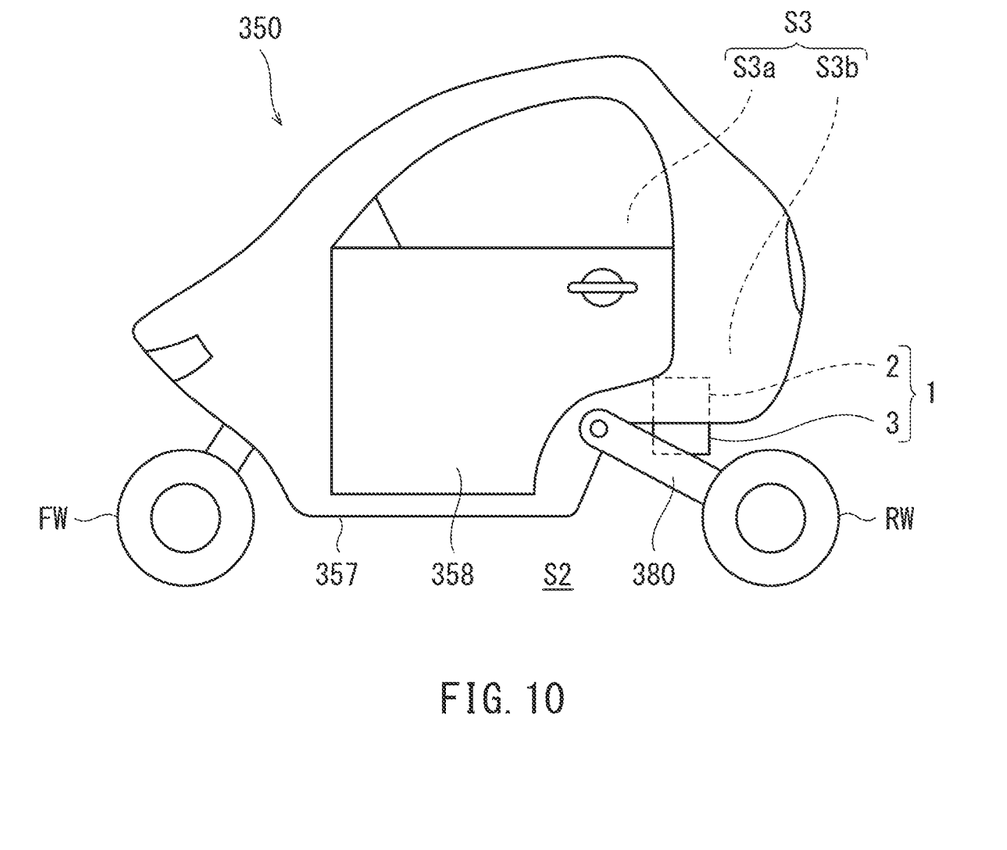
FIG. 10 is a side view of a modified example of the hybrid vehicle on which the power generation assembly of FIG. 2 is detachably mounted.

FIG. 10 is a side view of a hybrid vehicle 350 of a modified example on which the power generation assembly 1 of FIG. 2 is detachably mounted. As shown in FIG. 10, the vehicle 350 includes the pair of left and right rear wheels RW (target wheels). The vehicle 350 may include the pair of left and right front wheels FW or may include only one front wheel FW. The vehicle 350 includes: a left swing arm 380 that connects the left rear wheel RW to a vehicle body 357; and a right swing arm 380 that connects the right rear wheel RW to the vehicle body 357. One end portion of each swing arm 380 is turnably connected to the vehicle body 357, and the other end portion of each swing arm 380 is turnably connected to the rear wheel RW. A suspension (shock absorber) is located between each swing arm 380 and the vehicle body 357.

The vehicle body 357 defines a vehicle internal space S3 that is separated from the vehicle external space S2. The vehicle internal space S3 includes an occupant space S3$a$ in which a user gets. The occupant space S3$a$ is opened and closed by a door 358 attached to the vehicle body 357. The vehicle internal space S3 includes a rear accommodating space S3$b$ that is separated from the occupant space S3$a$. The rear accommodating space S3$b$ is located behind the occupant space S3$a$. The rear accommodating space S3$b$ is located above the swing arm 380.

At least part of the power generation assembly 1 is located in the rear accommodating space S3$b$. The power generation assembly 1 is supported by the vehicle body 357 in such a posture that the axial gap power generator 3 is located under the engine unit 2. At least part of the axial gap power generator 3 is located at a lower side of the vehicle body 357 and exposed to the vehicle external space S2. The axial gap power generator 3 may be located in both of the vehicle internal space S3 (in the present embodiment, the rear accommodating space S3$b$) and the vehicle external space S2, or the entire axial gap power generator 3 may be located in the vehicle external space S2. The engine unit 2 is located in the rear accommodating space S3$b$ but may be located in the vehicle external space S2.

The power generation assembly 1 is located between the left and right swing arms 380 in the left-right direction. In a side view, at least part of the power generation assembly 1 overlaps the swing arm 380. The power generation assembly 1 is mounted on the vehicle body 357 such that (when the vehicle 350 is in a stop state and an empty state) the lower end of the axial gap power generator 3 is located lower than an upper end of the rear wheel RW. The axial gap power generator 3 is located such that the lower end thereof is lower than an upper end (front end) of the swing arm 380.

In a side view, the axial gap power generator 3 is located so as to overlap the swing arm 380 (when the vehicle 350 is in a stop state and an empty state). The swing arm 380 is for the rear wheel, but the axial gap power generator 3 may be located so as to overlap a swing arm for the front wheel in a side view.

According to the above configuration, the axial gap power generator 3 is located such that the lower end thereof is lower than the upper end of the swing arm 380. Therefore, in the vehicle 350 which includes the swing arms 380 and in which the vehicle body 357 largely moves in the upper-lower direction by the suspensions, the center of gravity can be set to be adequately low. Moreover, since the axial gap power generator 3 is located in a space between the left and right swing arms 380, the space of the entire vehicle is efficiently used, and the arrangement space for the other on-vehicle parts can be secured. Since the other components are the same as those in the above embodiment or the above modified example, explanations thereof are omitted.

The present disclosure is not limited to the above embodiment and the modified examples. Modifications, additions, and eliminations may be made with respect to the configurations of the embodiment and the modified examples. For example, some of components or methods in one embodiment or one modified example may be applied to another embodiment or another modified example. Some components in an embodiment or a modified example may be separated and arbitrarily extracted from the other components in the embodiment or the modified example.

What is claimed is:

1. A power generation assembly comprising:
    an engine including:
        a crank shaft having an axial direction extending vertically; and
        a crank case that accommodates the crank shaft;
    an axial gap power generator located at a lower side of the engine and at one side of the engine in the axial direction and including:
        a rotor connected to the crank shaft so as to be rotatable about a rotation axis extending in the axial direction; and
        a stator opposed to the rotor in the axial direction while being spaced apart from the rotor in the axial direction; and
    an oil pan located at a lower portion of the crank case and above the axial gap power generator.

2. The power generation assembly according to claim 1, further comprising a cooling fan located at an opposite side of the axial gap power generator across the engine and connected to the crank shaft.

3. The power generation assembly according to claim 2, further comprising an air cleaner that purifies intake air to be supplied to the engine, wherein:
    the cooling fan is located at an upper side of the engine; and
    an upper end of the air cleaner is located higher than an upper end of the engine.

4. The power generation assembly according to claim 1, wherein:
    the engine further includes:
        a cylinder extending in a horizontal direction; and
        a valve gear that performs intake and discharge for the cylinder in association with the crank shaft;
    the valve gear is located at one side of the rotation axis in the horizontal direction; and
    the oil pan is located at the other side of the rotation axis in the horizontal direction.

5. The power generation assembly according to claim 1, further comprising:
    an engine cooling passage that cools the engine;
    a power generator cooling passage that communicates with the engine cooling passage and cools the axial gap power generator; and
    a cooling medium pump that supplies a cooling medium to the engine cooling passage and the power generator cooling passage.

6. The power generation assembly according to claim 1 wherein when viewed from the axial direction, the axial gap power generator is located inside an outer shape of the engine.

7. The power generation assembly according to claim 1, wherein the engine is a multiple cylinder engine.

8. The power generation assembly according to claim 1, wherein the axial gap power generator has both of a power generation function of generating electric power by rotational power of the crank shaft of the engine and a starter motor function of starting the engine.

9. The power generation assembly according to claim 1, further comprising an output interface that outputs rotational power of the crank shaft as energy other than electricity, wherein:
    an energy transmitting path extending from the crank shaft to the output interface includes a power transmitting path that transmits the rotational power; and
    the axial gap power generator is mechanically connected to the power transmitting path and outputs the rotational power.

10. A series hybrid vehicle comprising:
    the power generation assembly according to claim 1;
    a battery that is charged by electric power generated by the power generation assembly;
    a traction motor that is driven by the electric power supplied from the battery and generates traveling power;
    at least one wheel; and
    a vehicle body supported by the at least one wheel, wherein
    the power generation assembly is mounted on the vehicle body such that a lower end of the axial gap power generator is located lower than at least one upper end of the at least one wheel.

11. The series hybrid vehicle according to claim 10, wherein:
    the vehicle body defines a vehicle internal space that is separated from a vehicle external space; and
    the axial gap power generator is located at a lower side of the vehicle body such that at least part of the axial gap power generator is exposed to the vehicle external space.

12. The series hybrid vehicle according to claim 10, wherein:
    the at least one wheel comprises a pair of left and right wheels located away from each other in a left-right direction; and
    the axial gap power generator is located between the pair of left and right wheels.

13. The series hybrid vehicle according to claim 10, further comprising at least one swing arm including one end portion that is turnably connected to the vehicle body, wherein:
    the at least one wheel includes at least one target wheel to which the other end portion of the at least one swing arm is connected; and
    the axial gap power generator is located such that the lower end of the axial gap power generator is lower than an upper end of the at least one swing arm.

14. The series hybrid vehicle according to claim 13, wherein:
    the at least one target wheel comprises a pair of left and right wheels located away from each other in a left-right direction; and
    the axial gap power generator is located so as to overlap the at least one swing arm in a side view.

15. A power generation assembly, comprising:
    an engine including a crank shaft having an axial direction extending vertically;

an axial gap power generator located at a lower side of the engine and at one side of the engine in the axial direction and including:
  a rotor connected to the crank shaft so as to be rotatable about a rotation axis extending in the axial direction; and
  a stator opposed to the rotor in the axial direction while being spaced apart from the rotor in the axial direction; and
a sub-power generator that is located at an upper side of the engine, operates in association with the crank shaft, generates electric power to be used to drive the engine, and is smaller than the axial gap power generator.

16. A power generation assembly, comprising:
an engine including a crank shaft having an axial direction extending vertically;
an axial gap power generator located at one side of the engine in the axial direction and including:
  a rotor connected to the crank shaft so as to be rotatable about a rotation axis extending in the axial direction; and
  a stator opposed to the rotor in the axial direction while being spaced apart from the rotor in the axial direction; and
a regulator that converts AC power, generated by the axial gap power generator, into DC power and adjusts voltage of the DC power, and is integrally connected to the axial gap power generator.

* * * * *